US012361845B2

(12) United States Patent
Ellis

(10) Patent No.: US 12,361,845 B2
(45) Date of Patent: Jul. 15, 2025

(54) ILLUMINABLE SIGN FOR DISPLAYING A MESSAGE IN AN AUTOMOBILE WINDOW

(71) Applicant: Roderick Ellis, Pearland, TX (US)

(72) Inventor: Roderick Ellis, Pearland, TX (US)

( * ) Notice: Subject to any disclaimer, the term of this patent is extended or adjusted under 35 U.S.C. 154(b) by 104 days.

(21) Appl. No.: 18/478,147

(22) Filed: Sep. 29, 2023

(65) Prior Publication Data

US 2024/0257672 A1 Aug. 1, 2024

Related U.S. Application Data

(60) Provisional application No. 63/576,289, filed on Jan. 30, 2023.

(51) Int. Cl.

| | |
|---|---|
| ***G09F 13/18*** | (2006.01) |
| ***G09F 7/12*** | (2006.01) |
| ***G09F 9/33*** | (2006.01) |
| ***G09F 13/04*** | (2006.01) |
| ***G09F 13/08*** | (2006.01) |
| ***G09F 21/04*** | (2006.01) |

(52) U.S. Cl.

CPC .............. *G09F 13/044* (2021.05); *G09F 7/12* (2013.01); *G09F 9/33* (2013.01); *G09F 13/049* (2021.05); *G09F 13/08* (2013.01); *G09F 13/18* (2013.01); *G09F 21/048* (2013.01); *G09F 2007/122* (2013.01); *G09F 2013/1881* (2013.01)

(58) Field of Classification Search

CPC ... F16B 47/00; G09F 7/00; G09F 7/12; G09F 15/0025; G09F 21/04; G09F 21/042; G09F 21/049; G09F 13/18–2013/1895; Y10S 116/24

See application file for complete search history.

(56) References Cited

U.S. PATENT DOCUMENTS

| | | | | | |
|---|---|---|---|---|---|
| D416,783 | S * | 11/1999 | Hampshire | .................... | D8/373 |
| 6,888,940 | B1 * | 5/2005 | Deppen | ............... | B60R 11/0241 379/454 |
| 2002/0100782 | A1 * | 8/2002 | Marvin | ............... | B60R 11/0241 224/567 |
| 2007/0294095 | A1 * | 12/2007 | Schaum | ................. | G06Q 30/02 705/319 |
| 2018/0108282 | A1 * | 4/2018 | Mullett | ................ | G02B 6/0091 |

FOREIGN PATENT DOCUMENTS

| | | | | | |
|---|---|---|---|---|---|
| DE | 29805654 U1 | * | 7/1998 | | |
| GB | 2463027 A | * | 3/2010 | ............ | G09F 13/18 |
| JP | H075928 U | * | 1/1995 | | |
| JP | H078884 U | * | 2/1995 | | |

* cited by examiner

*Primary Examiner* — Cassandra Davis

(74) *Attorney, Agent, or Firm* — Jeffrey L. Streets

(57) ABSTRACT

An illuminable sign includes comprising a translucent panel having an engraved message and an electrically powered light source oriented to direct light into an edge of the translucent panel. A remote may be used to transmit a wireless signal to the illuminable sign when a button on the remote is pressed by a user. The illuminable sign includes a wireless receiver that receives the wireless signal and turns the light source on and off in response to the wireless signal. Accordingly, the user may selectively illuminate the sign and express the message to another person, such as a driver in an adjacent automobile. The illuminable sign may be securable to the inside of an automobile window using suction cups in a manner that the engraved message is directed to be viewed through the window.

16 Claims, 6 Drawing Sheets

ILLUMINABLE SIGN FOR DISPLAYING A MESSAGE IN AN AUTOMOBILE WINDOW

CROSS-REFERENCE TO RELATED APPLICATIONS

This application claims the benefit of priority of U.S. Provisional Patent Application Ser. No. 63/576,289 filed on Jan. 30, 2023, which application is incorporated by reference herein.

BACKGROUND

The present disclosure relates to methods and apparatus for controllably displaying a message using a light source.

BACKGROUND OF THE RELATED ART

Driving an automobile can be a difficult and tedious task. To get from one place to a desired destination, a driver will likely need to make several turns, make several lane changes, and control the speed and direction of an automobile during the duration of the trip. On popular roadways, the number of automobiles on the road causes traffic congestion. Under such traffic conditions, automobiles may be bumper-to-bumper and side-to-side. Some drivers may resort to aggressive and selfish driving behavior while other drivers may use more cooperative and helpful driving behavior. For example, if a particular driver is approaching a highway exit or an intersection where they need to turn but are in the wrong lane, that particular driver needs to turn on an appropriate turn signal indicating to other drivers around them that they desire to change lanes. An aggressive driver in the desired lane may see the turn signal blinking but block the particular driver's automobile from turning into that lane, whereas a cooperative driver in the desired lane may slow down to create a space that allows the particular driver's automobile to move into the desired lane without incident or missing their turn.

BRIEF SUMMARY

Some embodiments provide an illuminable sign comprising a translucent panel having an edge and a surface that is engraved with a message. The illuminable sign further comprises an electrically-powered light source positioned directly adjacent the edge of the translucent panel and oriented to direct light from the light source into the translucent sign element from the edge of the translucent panel, a first battery, an electrical switch having a first connection to the first battery and a second connection to the electrically-powered light source, wherein the electrical switch is operable to selectively control the supply of electricity from the first battery to the electrically-powered light source, and a wireless receiver electrically connected to the electrical switch, wherein the wireless receiver generates an output signal that controls the operation of the electrical switch in response to receiving a wireless control signal. Still further, the illuminable sign comprises a frame member secured to the translucent panel along the edge of the translucent panel, wherein the frame member secures the electrically-power light source in position directly adjacent the edge of the translucent panel and orients the electrically-powered light source to direct light into the translucent sign element from the edge of the translucent panel, and wherein the frame member further secures the first battery, the electrical switch and the wireless receiver. The illuminable sign further comprises a first suction cup having a first head secured to the frame member and a first suction flange directed in a first direction that is generally perpendicular to the translucent panel, and a second suction cup having a second head secured to the frame member and a second suction flange directed in the first direction. The illuminable sign also comprises a wireless transmitter unit including a housing, a second battery disposed within the housing, a wireless transmitter circuit disposed within the housing, and a button connected to the wireless transmitter circuit and accessible for manual actuation by a person, wherein manual actuation of the button causes the wireless transmitter circuit to transmit the wireless control signal to the wireless receiver, and wherein the engraved message is illuminated by the electrically-powered light source in response to manual actuation of the button.

Some embodiments provide a method of messaging a person in an adjacent automobile. The method may comprise installing the illuminable sign according to any of the disclosed embodiments into a first automobile so that the suction flanges are secured to a window of the first automobile and the wireless transmitter unit is secured to the interior dash of the first automobile. The method may further comprise driving the first automobile on a roadway with other automobiles including the adjacent automobile, and manually actuating the button of the wireless transmitter to cause the engraved message to be illuminated as the first automobile is positioned to display the message to a person in the adjacent automobile.

DETAILED DESCRIPTION

Figure 1A:
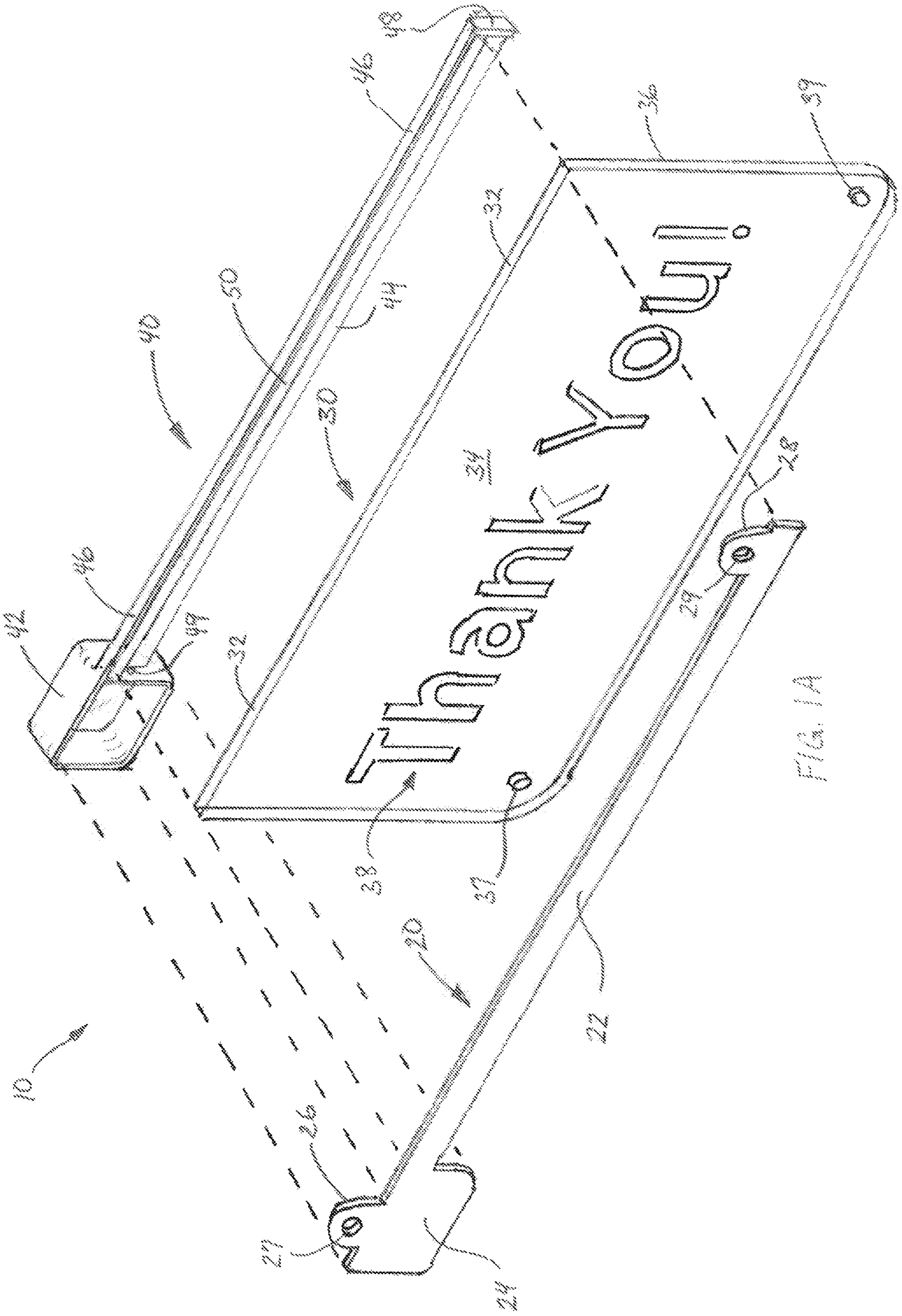
FIG. 1A is an assembly view of an illuminable sign including a front frame piece, a translucent panel, and a back frame piece.

Some embodiments provide an illuminable sign comprising a translucent panel having an edge and a surface that is engraved with a message. The illuminable sign further comprises an electrically-powered light source positioned directly adjacent the edge of the translucent panel and oriented to direct light from the light source into the translucent sign element from the edge of the translucent panel, a first battery, an electrical switch having a first connection to the first battery and a second connection to the electrically-powered light source, wherein the electrical switch is operable to selectively control the supply of electricity from the first battery to the electrically-powered light source, and a wireless receiver electrically connected to the electrical switch, wherein the wireless receiver generates an output signal that controls the operation of the electrical switch in response to receiving a wireless control signal. Still further, the illuminable sign comprises a frame member secured to the translucent panel along the edge of the translucent panel, wherein the frame member secures the electrically-power light source in position directly adjacent the edge of the translucent panel and orients the electrically-powered light source to direct light into the translucent sign element from the edge of the translucent panel, and wherein the frame member further secures the first battery, the electrical switch and the wireless receiver. The illuminable sign further comprises a first suction cup having a first head secured to the frame member and a first suction flange directed in a first direction that is generally perpendicular to the translucent panel, and a second suction cup having a second head secured to the frame member and a second suction flange directed in the first direction. The illuminable sign also comprises a wireless transmitter unit including a housing, a second battery disposed within the housing, a wireless transmitter circuit disposed within the housing, and a button connected to the wireless transmitter circuit and accessible for manual actuation by a person, wherein manual actuation of the button causes the wireless transmitter circuit to transmit the wireless control signal to the wireless receiver, and wherein the engraved message is illuminated by the electrically-powered light source in response to manual actuation of the button.

In some embodiments, the translucent panel may be made of acrylic. Other translucent polymers may also be used. Optionally, the translucent panel may include both a polymeric material, such as acrylic, mixed with a colorant. When a colorant is included in the polymeric material, the light source may emit a white light into the translucent panel, yet the colorant may cause the engraved message to light up with the color of the colorant.

In some embodiments, the electrically powered light source may be a strip containing a plurality of light-emitting diodes (LEDs). Light-emitting diodes are energy efficient so as to conserve use of the battery, may from a strip having a small width and thickness, and are light-weight. Optionally, the LEDs may be configured to only produce a white light, a colored light, or a variety of light colors based upon a user-selection.

In some embodiments, the frame member may include one or more compartments that contains the first battery, the electrical switch and/or the wireless receiver. The frame member may be secured along the edge of the translucent panel and may secure the electrically-power light source. In one option, the compartment may extend away from the translucent panel in a second direction that is opposite the first direction. Furthermore, the compartment may be offset to one side of the translucent panel.

In some embodiments, the edge of the translucent panel may be linear, and the frame member may extend along an entire length of the linear edge of the translucent panel. For example, the translucent panel may be substantially rectangular with or without one or more rounded corners. In one configuration, the translucent panel is rectangular with the upper corners squared and with the lower corners rounded.

In some embodiments, the frame member may comprise a front frame piece and a back frame piece that is secured to the front frame piece and/or secured to the translucent panel in alignment with the front frame piece. In one option, the front frame piece may include a front lip that extends along a front face of the translucent panel and the back frame piece may include a back lip that extends along a back face of the translucent panel. Furthermore, the front lip of the front frame piece may be adhesively secured to the front face of the translucent panel along the linear edge of the translucent panel and/or the back lip of the back frame piece may be adhesively secured to the back face of the translucent panel along the linear edge of the translucent panel. In a further option, the front lip and/or the back lip may extend around first and/or second ends (lateral sides) of the translucent panel.

In some embodiments, the illuminable sign may further comprise a third suction cup having a third head secured to the translucent panel and a third suction flange directed in the first direction, and a fourth suction cup having a fourth head secured to the translucent panel and a fourth suction flange directed in the first direction. Optionally, the translucent panel may include first and second holes therethrough, wherein the third head is securely received within the first hole and the fourth head is securely received within the second hole. The first, second, third and fourth suction flanges are preferably securable to a glass window with the translucent panel oriented so that the engraved message is directed toward the glass window for viewing by a person on the opposite side of the glass window. In certain embodiments, the illuminable sign may be secured to the inside surface of an automobile window such that the engraved message is viewable by a person in an adjacent automobile. The illuminable sign may be secured to any window of the automobile, such as a left or right side window behind the front seat, such as a window adjacent the back seat, or a back window facing rearward of the automobile.

In some embodiments, the illuminable sign may further comprise an attachment device adapted to secure the wireless transmitter (also referred to as a "remote" or "wireless remote controller") to a surface of an automobile interior dash. Optionally, the attachment device may be an adhesive foam element, perhaps having adhesive on both sides of the foam element.

In some embodiments, the frame member has a first upwardly directed tab with a first hole for receiving the first head and a second upwardly directed tab with a second hole for receiving the second head. Optionally, the first and second upwardly directed tabs may be included in the front frame piece.

In some embodiments, the message comprises alphabetic characters, numerals, symbols, logos and/or designs. The engraved message may be molded into the translucent panel or may be cut into the translucent panel using a router bit or similar cutting tool, or perhaps formed using a laser.

Some embodiments provide a method of messaging a person in an adjacent automobile. The method may comprise installing the illuminable sign according to any of the disclosed embodiments into a first automobile so that the suction flanges are secured to a window of the first automobile and the wireless transmitter unit is secured to the interior dash of the first automobile. The method may further comprise driving the first automobile on a roadway with other automobiles including the adjacent automobile, and manually actuating the button of the wireless transmitter to cause the engraved message to be illuminated as the first automobile is positioned to display the message to a person in the adjacent automobile.

FIG. 1A is an assembly view of an illuminable sign 10 including a front frame piece 20, a translucent panel 30, and a back frame piece 40. The front frame piece 20 is an elongated component that extends along an upper edge 32 of the translucent panel 30. The front frame piece 20 includes a lip 22 that extends over a front surface 34 of the translucent panel 30, a cover 24 that extends over an opening in a compartment 42 formed by the back frame piece 40, and a pair of tabs 26, 28 with holes 27, 29 for receiving a suction cup (not shown).

The back frame piece 40 is an elongated component that similarly extends along the upper edge 32 of the translucent panel 30. However, the back frame piece 40 includes a lip 44 that extends over a back surface 36 (opposite of the front surface 34) of the translucent panel 30, a rail 46 that extends over the upper edge 32 of the translucent panel 30 from the back lip 44 to the front lip 22 of the front frame piece 20, and the compartment 42 that is disposed to one side of the translucent panel 30. In the embodiment shown, the lip 44 of the back frame piece 40 includes an end cap 48 that extends around an end of the translucent panel 30. The compartment 42 may also include a hole or opening 49 through which electrically conductive wires (not shown) may extend in order to connect a light source 50 secured to the rail 46 to a battery (not shown) within the compartment 42.

The translucent panel 30 includes an engraved message 38 that is illustrated here as saying "Thank You!" The engraved message 38 may be molded or cut to have graphical elements that are recessed into the translucent panel 30. Accordingly, when light is directed into the edge of the translucent panel 30, the recessed surfaces of the graphical elements may be illuminated such that the engraved message can be easily seen even in the dark. Optionally, the translucent panel 30 may also include at least a pair of holes 37, 39 along a lower edge of the translucent panel 30 for securing additional suction cups.

Figure 1B:
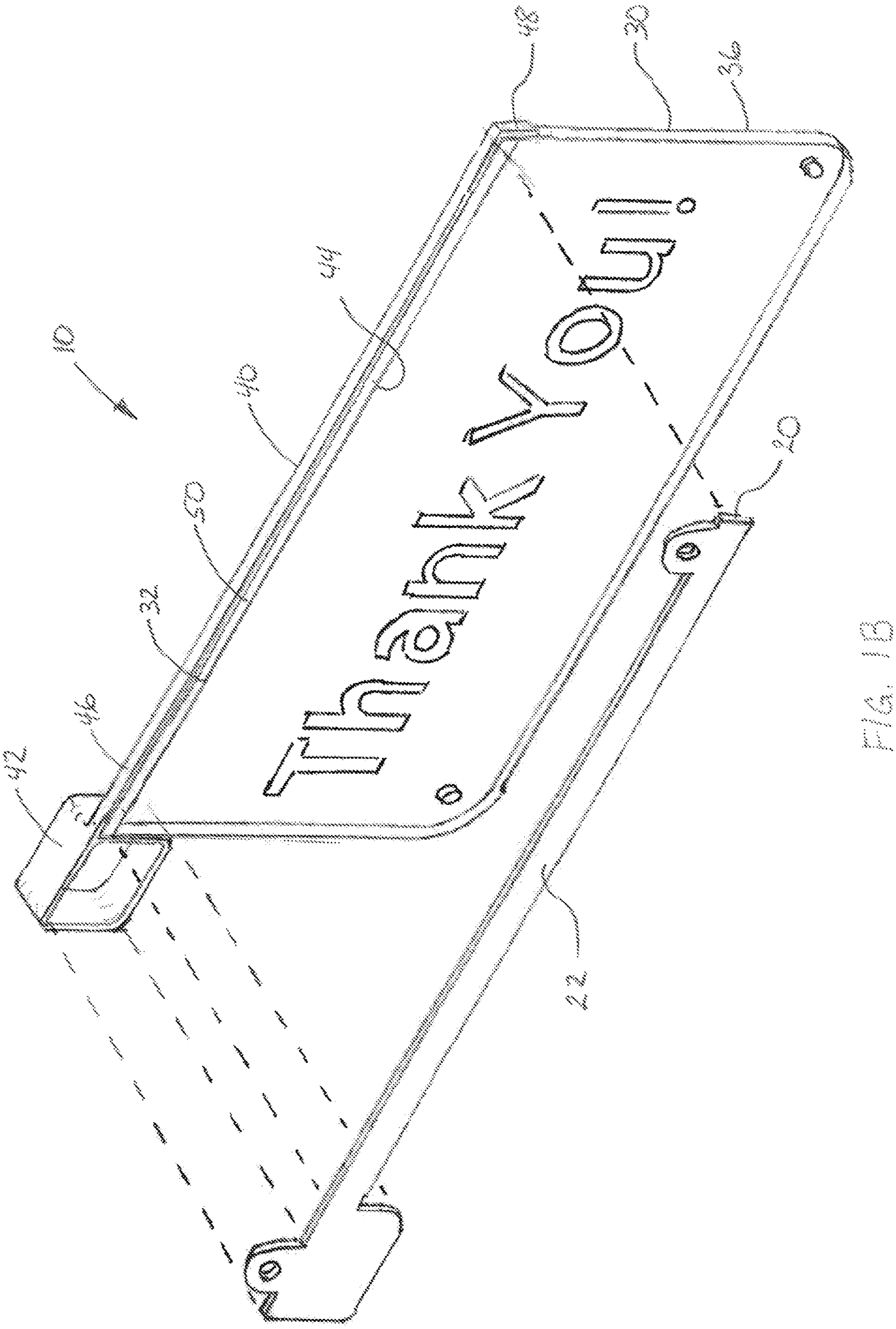
FIG. 1B is an assembly view of the illuminable sign of FIG. 1A with the back frame piece secured along a top edge of the translucent panel.

FIG. 1B is an assembly view of the illuminable sign 10 of FIG. 1A with the back frame piece 40 secured along the top edge 32 of the translucent panel 30. As shown, the back lip 44 is adhesively secured in face-to-face contact with the back surface 36 of the translucent panel 30 (see also FIG. 3). In this position, the light source 50 is directly opposite (above) the upper edge 32 of the translucent panel 30 such that light may be directed (downwardly) into the translucent panel 30. Accordingly, the illuminable sign 10 may be referred to as an edge-lit display or sign. Optionally, the light source 50 may be a series of LEDs and the translucent panel 30 may be made of acrylic. In the illustrated embodiments, note that the end cap 48 wraps around the side of the translucent panel 30. In combination with the back lip 44, the compartment 42, and the front lip 22, the end cap 48 may prevent light from being directly emitted from the illuminable sign 10 without first passing through the translucent panel 30. In other words, all of the light emitted by the light source 50 is directed into the upper edge 32 of the translucent panel 30. Surrounding the light source with the back lip 44, the compartment 42, and the front lip 22, and the end cap 48 makes efficient use of the light source 50 but also prevents the illuminable sign 10 from having bright spots that may be distracting or unwanted.

Figure 1C:
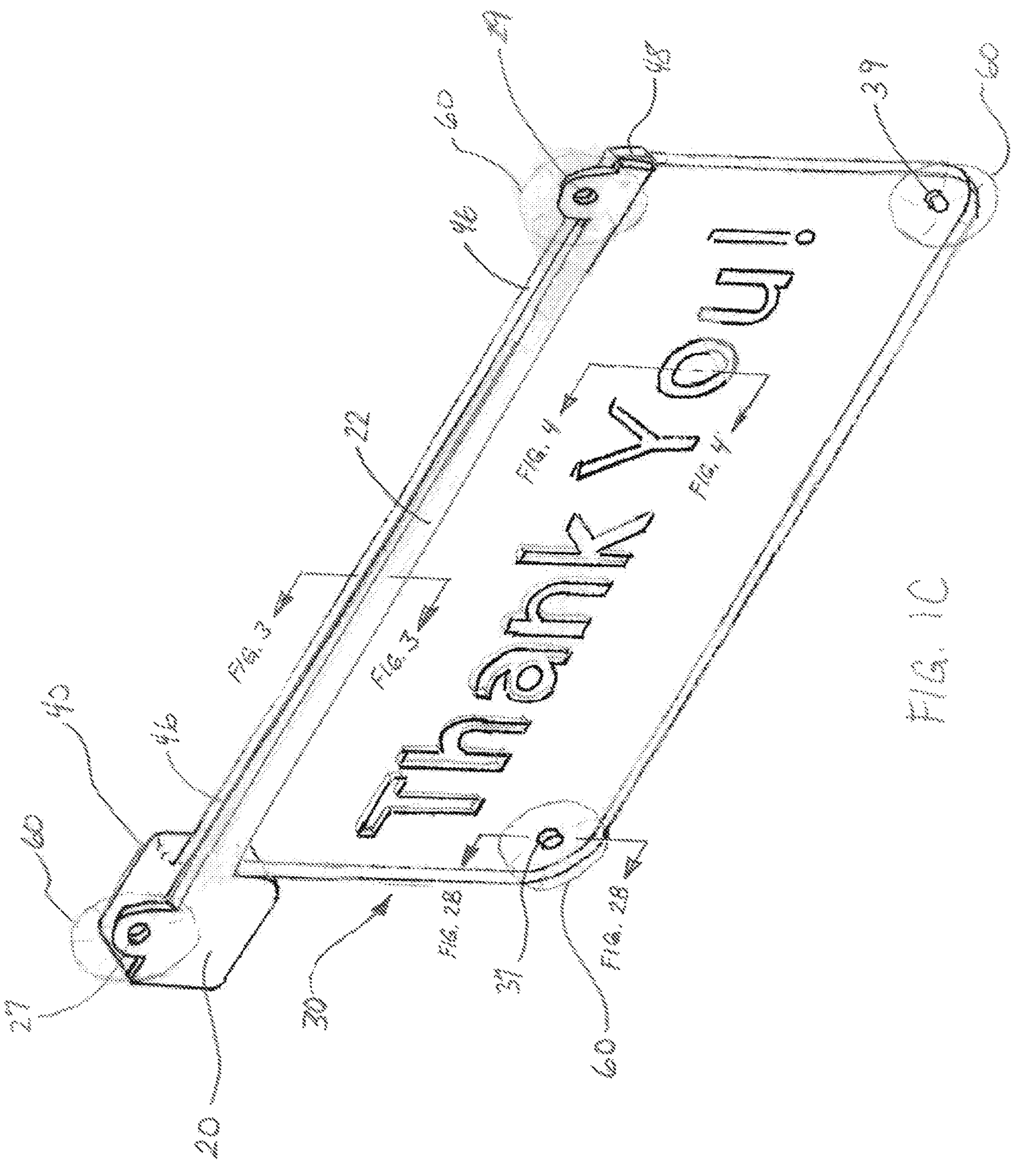
FIG. 1C is an assembly view of the illuminable sign of FIG. 1B with the front frame piece secured along the top edge of the translucent panel.

FIG. 1C is a perspective view of the fully assembled illuminable sign 10 of FIG. 1B with the front frame piece 20 adhesively secured along the top edge 32 (no longer visible; see FIGS. 1A and 1B) of the translucent panel 30. Alternatively, the front and back frame pieces 20, 40 could be secured together with screws, snap-together elements or other fasteners. The illustrated embodiment of the illuminable sign 10 includes a set of four suction cups 60 securely received into the four holes 27, 29, 37, 39. The suction cups 60 are illustrated as translucent suction cups.

Figure 2A:
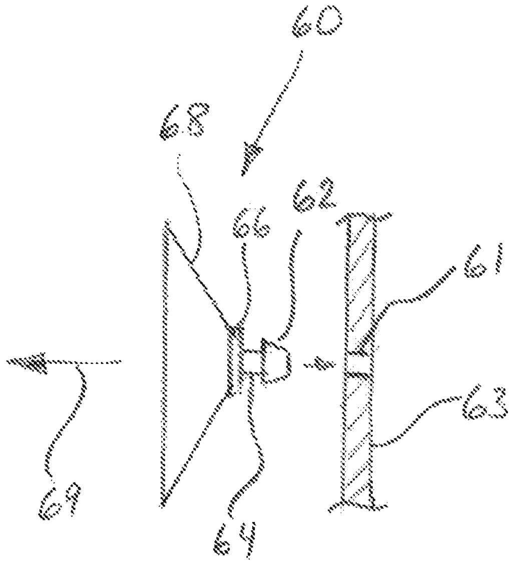
FIGS. 2A-B are cross-sectional diagrams of a suction cup aligned for insertion into a hole of the illuminable sign and subsequently securely received in the hole.
Figure 2B:
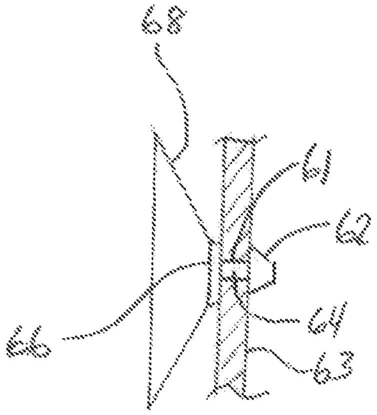

FIGS. 2A-B are cross-sectional diagrams of an individual suction cup 60 aligned for insertion into a hole 61 that is representative of any or all of the four holes 27, 29, 37, 39. The suction cup 60 has a head 62, a shaft 64, a base 66 and a suction flange 68 directed in a first direction 69 that is generally perpendicular to the member 63 that is representative of either or both of the tab 26 and the translucent panel 30.

FIG. 2B is a cross-sectional diagram of the suction cup 60 of FIG. 2A after the head 62 has been forced through the hole 61. Accordingly, the shaft 64 is received through the hole 61 and the head 62 prevents the shaft 64 from being pulled out of the hole 61. The base 66 is preferably pulled snug against the member 63.

Figure 3:
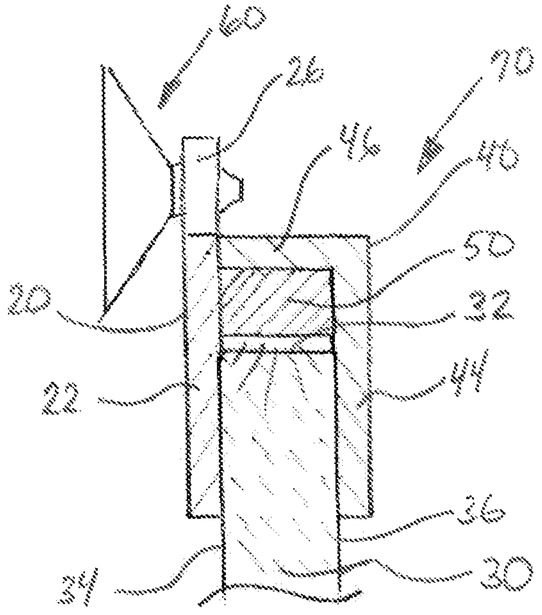
FIG. 3 is a cross-sectional diagram of a frame member secured along the top edge of the translucent panel.

FIG. 3 is a cross-sectional diagram of a frame member 70 secured along the top edge 32 of the translucent panel 30. The frame member 70 includes the front frame piece 20 and the back frame piece 40. Specifically, the frame member 70 may be formed by the front lip 22 (secured to the front surface 34 of the translucent panel 30), the back lip 44 (secured to the back surface 36 of the translucent panel 30) and the rail 46 that extends from the back lip 44 to the front lip 22. The light source 50 is secured to the rail 46 and is positioned directly above the upper edge 32 of the translucent panel 30 to direct light (downwardly) into the edge 32 of the translucent panel 30.

Figure 4:
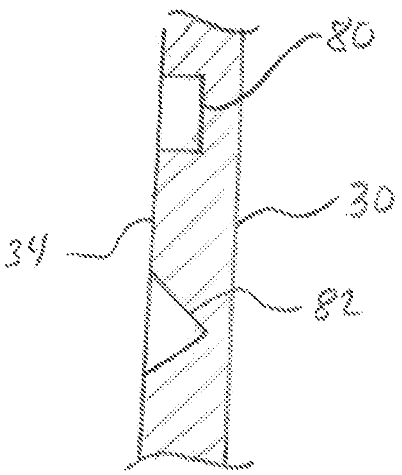
FIG. 4 is a cross-sectional diagram of the translucent panel with portions of an engraved message having different shapes of channels.

FIG. 4 is a cross-sectional diagram of the translucent panel 30 with portions of an engraved message having different shapes of channels. For example, one graphical element 80 forms a rectangular channel extending partially into the front face 34 of the translucent panel 30 and another graphical element 82 forms a triangular channel extending partially into the front face 34 of the translucent panel 30.

Figure 5:
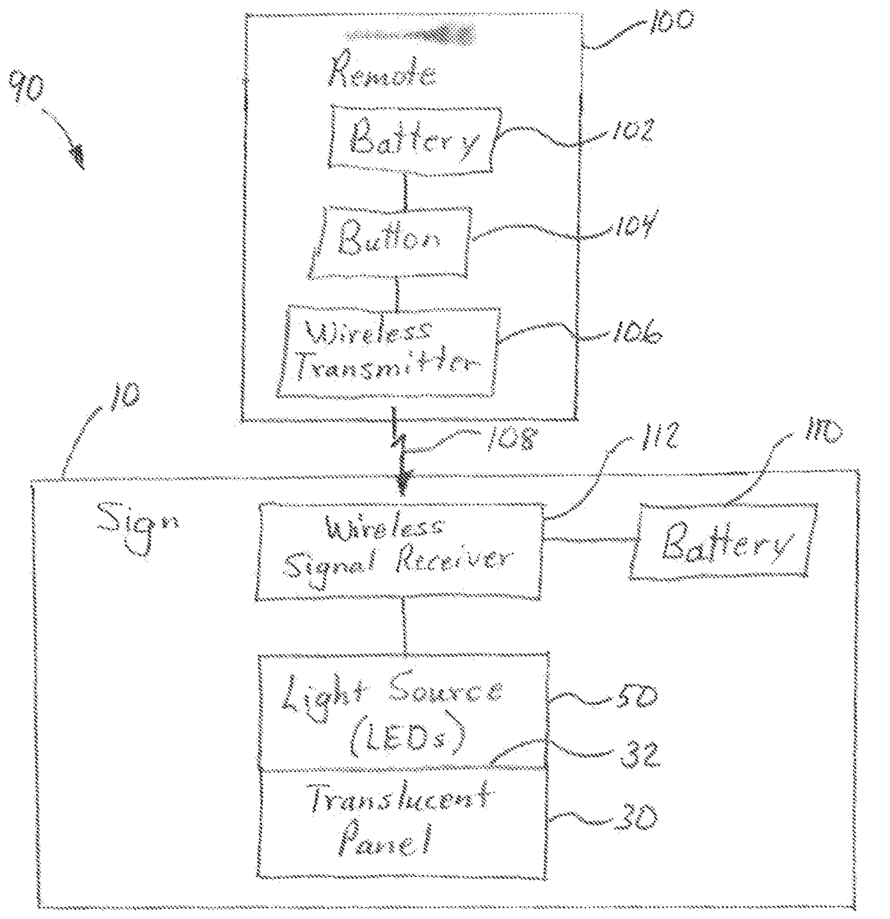
FIG. 5 is a system diagram for the illuminable sign and the remote control.

FIG. 5 is a diagram of a system 90 including the illuminable sign 10 and a remote control 100. The remote control 100 includes a (first) battery 102, a button 104 and a wireless transmitter 106. When a user manually presses the button 104, electrical energy from the battery 102 is supplied to the wireless transmitter 106 such that a wireless signal 108 is transmitted into the air.

The illuminable sign 10 includes a (second) battery 110 and a wireless signal receiver 112, as well as the light source 50 and the translucent panel 30. When the wireless signal receiver 112 detects the wireless signal 108, electrical energy from the battery 110 is supplied to the light source 50 so that light is directed into the edge 32 of the translucent panel 30. In one option, the wireless transmitter 106 only transmits the wireless signal 108 while the user depresses the button 104. In another option, the button 104 is a toggle button such that the wireless transmitter 106 transmits the wireless signal 108 after the user depresses the button 104 a first time (to turn on the illuminable sign 10) and continues to transmit the wireless signal 108 until the user depresses the button 104 a second time (to turn off the illuminable sign 10).

Figure 6:
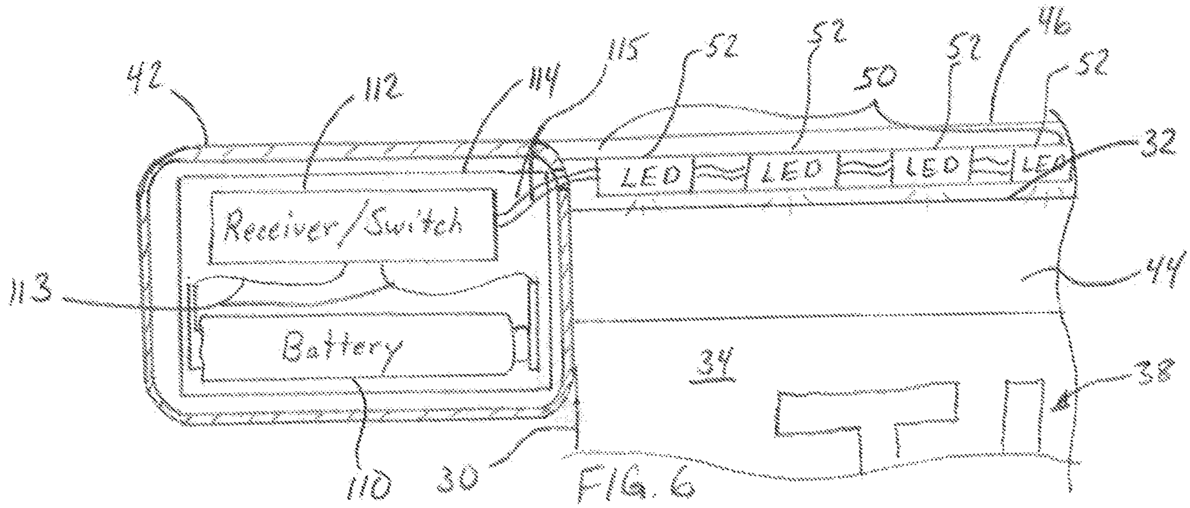
FIG. 6 is a diagram of the electrical components of the illuminable sign.

FIG. 6 is a diagram of the electrical components of the illuminable sign 10. The compartment 42 contains and/or secures the wireless signal receiver 112, which both may be secured to a circuit board or other substrate 114. The wireless signal receiver 112 may operate as a switch that selectively supplies energy from the battery to the light source 50. Specifically, the battery 110 is electrically coupled to the wireless signal receiver 112 via conductive wires or traces 113 and the wireless signal receiver 112 is electrically coupled to the light source 50 via conductive wires or traces 115. The light source 50 may includes a series of light-emitting diodes (LEDs) 52 that may be secured to the rail 46 and may each selectively generate light that is directed into the upper edge 32 of the translucent panel 30 under the control of the wireless signal receiver 112.

Figure 7:
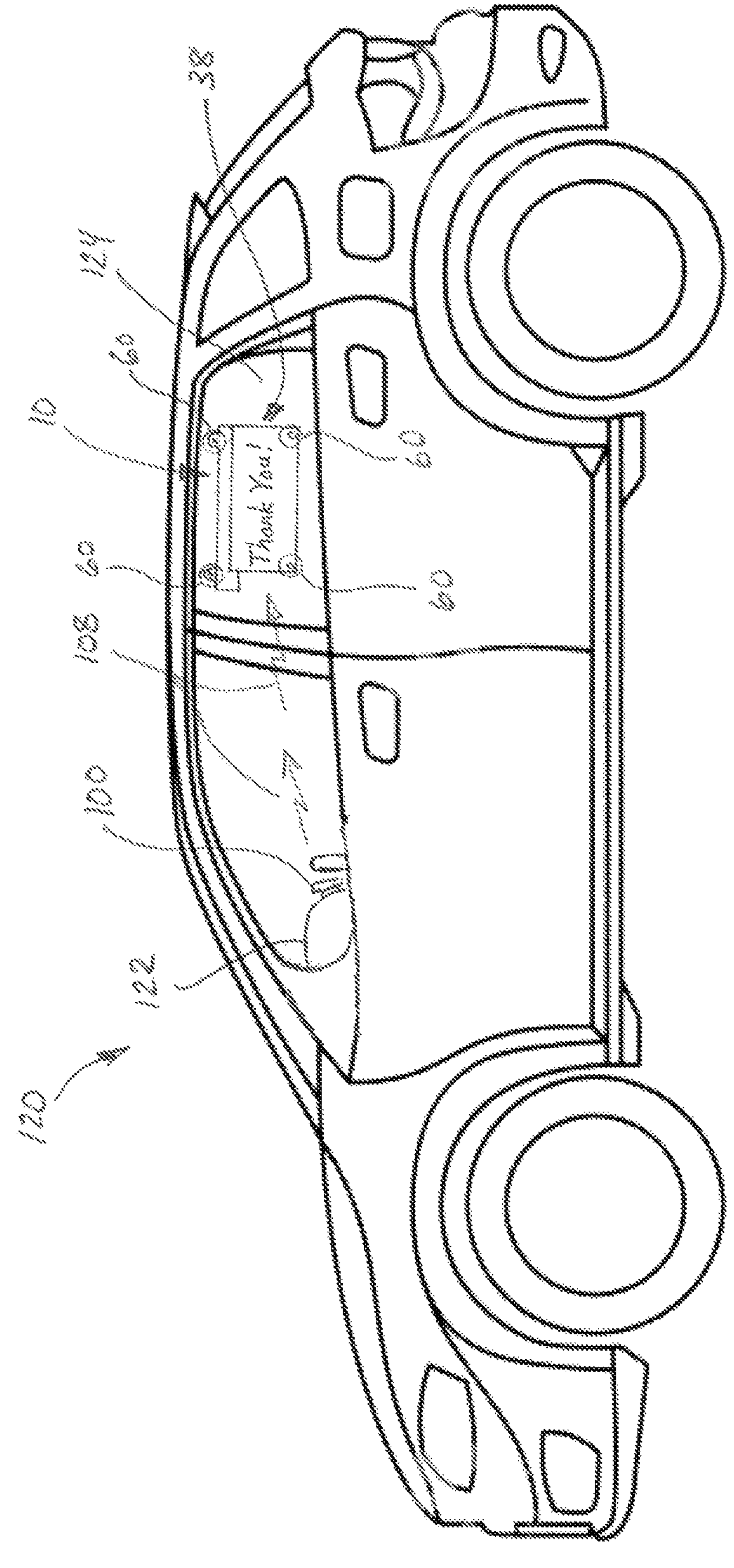
FIG. 7 is a side view of an automobile with a wireless transmitter secured to a dash of the automobile and the illuminable sign secured to a rear side window of the automobile.

FIG. 7 is a side view of an automobile 120 with a remote 100 secured to a dash 122 of the automobile and the illuminable sign 10 secured to a rear side window 124 of the automobile with the suction cups 60. When the user presses the button on the remote 100, the wireless signal 108 is transmitted into the air and received by a wireless receiver in the illuminable sign 10. The wireless receiver then causes the illuminable sign 10 to turn on/off to display the engraved message 38 to a person or driver in another automobile alongside of the automobile 120. For example, the use may turn on the sign to express the message "Thank You!" to another driver for driving in a courteous manner. If the illuminable sign 10 is secured to another window of the automobile 120, such as a rear window, then the sign may be turned on to display the engraved message 38 to a person or driver in another automobile behind the automobile 120.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may" and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. An illuminable sign, comprising:

a translucent panel having an edge and a surface that is engraved with a message;

an electrically powered light source positioned directly adjacent the edge of the translucent panel and oriented to direct light from the light source into the translucent panel from the edge of the translucent panel;

a first battery;

an electrical switch having a first connection to the first battery and a second connection to the electrically powered light source, wherein the electrical switch is operable to selectively control the supply of electricity from the first battery to the electrically powered light source;

a wireless receiver electrically connected to the electrical switch, wherein the wireless receiver generates an output signal that controls the operation of the electrical switch in response to receiving a wireless control signal;

a frame member secured to the translucent panel along the edge of the translucent panel, wherein the frame member secures the electrically-power light source in position directly adjacent the edge of the translucent panel and orients the electrically powered light source to direct light into the translucent panel from the edge of the translucent panel, and wherein the frame member further secures the first battery, the electrical switch and the wireless receiver;

a first suction cup having a first head secured to the frame member and a first suction flange directed in a first direction that is generally perpendicular to the translucent panel;

a second suction cup having a second head secured to the frame member and a second suction flange directed in the first direction; and a wireless transmitter unit including a housing, a second battery disposed within the housing, a wireless transmitter circuit disposed within the housing, and a button connected to the wireless transmitter circuit and accessible for manual actuation by a person, wherein manual actuation of the button causes the wireless transmitter circuit to transmit the wireless control signal to the wireless receiver, wherein the engraved message is illuminated by the electrically-powered light source in response to manual actuation of the button, and wherein the frame member has a first upwardly directed tab with a first hole for receiving the first head and a second upwardly directed tab with a second hole for receiving the second head.

2. The illuminable sign of claim 1, wherein the translucent panel is made of acrylic.

3. The illuminable sign of claim 1, wherein the electrically powered light source is a strip containing a plurality of light-emitting diodes.

4. The illuminable sign of claim 1, wherein the frame member includes a compartment, wherein the compartment contains the first battery, the electrical switch and the wireless receiver, and wherein the frame member is secured along the edge of the translucent panel and secures the electrically-power light source.

5. The illuminable sign of claim 4, wherein the compartment extends away from the translucent panel in a second direction that is opposite the first direction.

6. The illuminable sign of claim 4, wherein the edge of the translucent panel is linear and the frame member extends along an entire length of the linear edge of the translucent panel.

7. The illuminable sign of claim 6, wherein the frame member comprises a front frame piece and a back frame piece that is secured to the front frame piece, wherein the front frame piece includes a front lip that extends along a front face of the translucent panel and the back frame piece includes a back lip that extends along a back face of the translucent panel.

8. The illuminable sign of claim 7, wherein the front lip and/or the back lip extend around first and second ends of the translucent panel.

9. The illuminable sign of claim 1, further comprising:

a third suction cup having a third head secured to the translucent panel and a third suction flange directed in the first direction; and a fourth suction cup having a fourth head secured to the translucent panel and a fourth suction flange directed in the first direction.

10. The illuminable sign of claim 9, wherein the translucent panel includes first and second holes therethrough, wherein the third head is securely received within the first hole and the fourth head is securely received within the second hole.

11. The illuminable sign of claim 10, wherein the first, second, third and fourth suction flanges are securable to a glass window with the translucent panel oriented so that the engraved message is directed toward the glass window.

12. The illuminable sign of claim 1, further comprising:

an attachment device adapted to secure the wireless transmitter to a surface of an automobile interior dash.

13. The illuminable sign of claim 1, further comprising:

an adhesive foam element for securing the wireless transmitter to a surface of an automobile interior dash.

14. The illuminable sign of claim 1, wherein the message comprises alphabetic characters, numerals, symbols, logos or designs.

15. An illuminable sign, comprising:

a translucent panel having an edge and a surface that is engraved with a message;

an electrically powered light source positioned directly adjacent the edge of the translucent panel and oriented to direct light from the light source into the translucent panel from the edge of the translucent panel;

a first battery;

an electrical switch having a first connection to the first battery and a second connection to the electrically powered light source, wherein the electrical switch is operable to selectively control the supply of electricity from the first battery to the electrically powered light source;

a wireless receiver electrically connected to the electrical switch, wherein the wireless receiver generates an output signal that controls the operation of the electrical switch in response to receiving a wireless control signal;

a frame member secured to the translucent panel along the edge of the translucent panel, wherein the frame member secures the electrically-power light source in position directly adjacent the edge of the translucent panel and orients the electrically powered light source to direct light into the translucent panel from the edge of the translucent panel, wherein the frame member further secures the first battery, the electrical switch and the wireless receiver, wherein the frame member comprises a front frame piece and a back frame piece that is secured to the front frame piece, wherein the front frame piece includes a front lip that extends along a front face of the translucent panel and the back frame piece includes a back lip that extends along a back face of the translucent panel, wherein the edge of the translucent panel is linear and the frame member extends along an entire length of the linear edge of the translucent panel, wherein the frame member includes a compartment, and wherein the compartment contains the first battery, the electrical switch and the wireless receiver;

a first suction cup having a first head secured to the frame member and a first suction flange directed in a first direction that is generally perpendicular to the translucent panel;

a second suction cup having a second head secured to the frame member and a second suction flange directed in the first direction; and a wireless transmitter unit including a housing, a second battery disposed within the housing, a wireless transmitter circuit disposed within the housing, and a button connected to the wireless transmitter circuit and accessible for manual actuation by a person, wherein manual actuation of the button causes the wireless transmitter circuit to transmit the wireless control signal to the wireless receiver, and wherein the engraved message is illuminated by the electrically-powered light source in response to manual actuation of the button, wherein the front lip of the front frame piece is adhesively secured to the front face of the translucent panel along the linear edge of the translucent panel and/or the back lip of the back frame piece is adhesively secured to the back face of the translucent panel along the linear edge of the translucent panel.

16. A method of messaging a person in an adjacent automobile, comprising:

installing an illuminable sign into a first automobile, wherein the illuminable sign comprises:

a translucent panel having an edge and a surface that is engraved with a message;

an electrically powered light source positioned directly adjacent the edge of the translucent panel and oriented to direct light from the light source into the translucent panel from the edge of the translucent panel;

a first battery;

an electrical switch having a first connection to the first battery and a second connection to the electrically powered light source, wherein the electrical switch is operable to selectively control the supply of electricity from the first battery to the electrically powered light source;

a wireless receiver electrically connected to the electrical switch, wherein the wireless receiver generates an output signal that controls the operation of the electrical switch in response to receiving a wireless control signal;

a frame member secured to the translucent panel along the edge of the translucent panel, wherein the frame member secures the electrically-power light source in position directly adjacent the edge of the translucent panel and orients the electrically powered light source to direct light into the translucent panel from the edge of the translucent panel, and wherein the frame member further secures the first battery, the electrical switch and the wireless receiver;

a first suction cup having a first head secured to the frame member and a first suction flange directed in a first direction that is generally perpendicular to the translucent panel;

a second suction cup having a second head secured to the frame member and a second suction flange directed in the first direction; and a wireless transmitter unit including a housing, a second battery disposed within the housing, a wireless transmitter circuit disposed within the housing, and a button connected to the wireless transmitter circuit and accessible for manual actuation by a person, wherein manual actuation of the button causes the wireless transmitter circuit to transmit the wireless control signal to the wireless receiver, wherein the engraved message is illuminated by the electrically-powered light source in response to manual actuation of the button, and wherein the illuminable sign is installed into the first automobile so that the suction flanges are secured to a window of the first automobile and the wireless transmitter unit is secured to the interior dash of the first automobile;

driving the first automobile on a roadway with other automobiles including the adjacent automobile; and manually actuating the button of the wireless transmitter to cause the engraved message to be illuminated as the first automobile is positioned to display the message to a person in the adjacent automobile.

* * * * *